May 28, 1968 W. A. WARD 3,385,040
COTTON HARVESTING DEVICE

Filed Sept. 29, 1965 2 Sheets-Sheet 1

INVENTOR
William A. Ward

BY Wilkinson, Mawhinney & Theibault
ATTORNEY

May 28, 1968  W. A. WARD  3,385,040
COTTON HARVESTING DEVICE
Filed Sept. 29, 1965  2 Sheets-Sheet 2
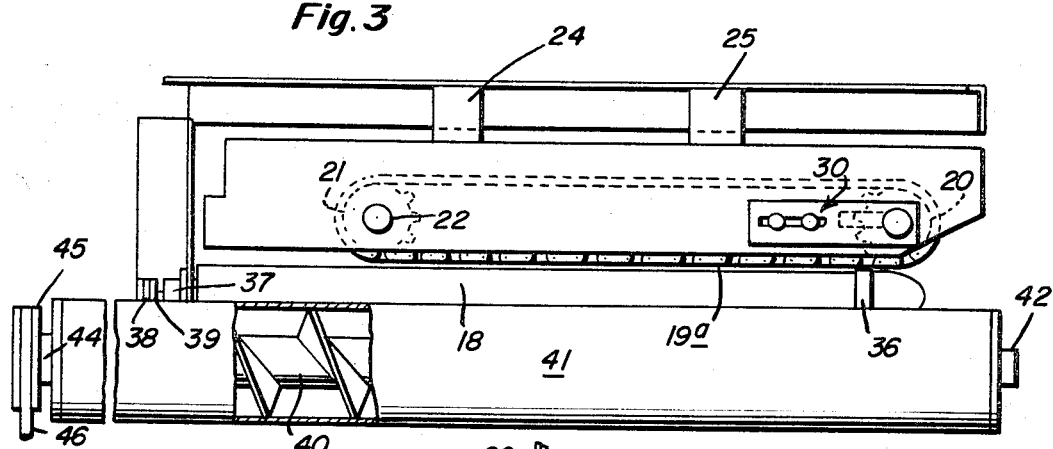
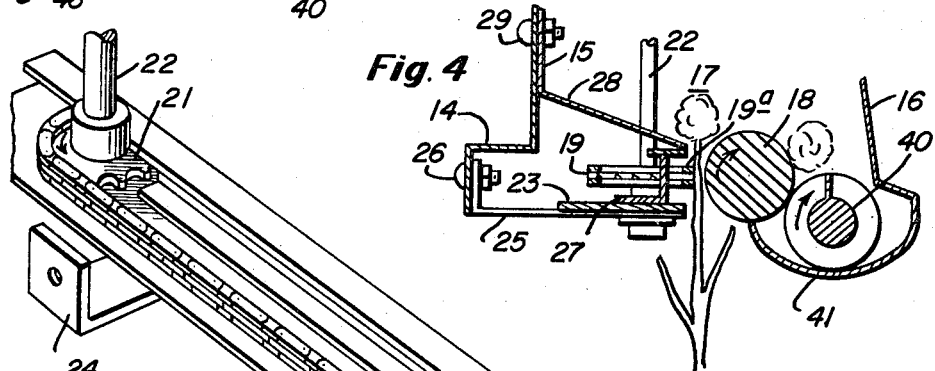
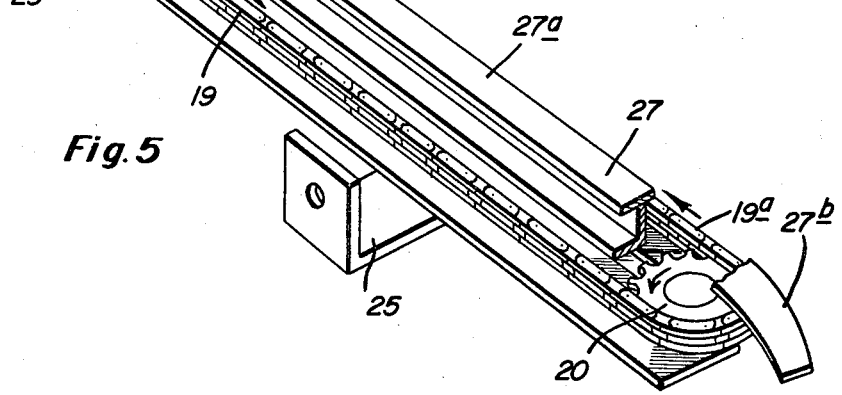
INVENTOR
William A. Ward
BY *Wilkinson, Mawhinney & Theibault*
ATTORNEY

United States Patent Office 3,385,040
Patented May 28, 1968

3,385,040
COTTON HARVESTING DEVICE
William Alvin Ward, Rte. 2, Memphis, Tex. 79245
Filed Sept. 29, 1965, Ser. No. 491,325
7 Claims. (Cl. 56—33)

The present invention relates to a cotton harvesting device and has for an object to provide a novel form of picker couple involving a stripper roll having an upward motion through the stripping throat combined with an endless companion member having a rearwardly moving run forming the other side of the throat for developing a rearward thrust component to the cotton stalks extending upwardly through the throat whereby such stalks are shifted rearwardly and at the same time imparting a slight roll to the stalks whereby to cleanly remove the bolls from the stalks and preventing clogging of the device and thus eliminating the necessity of stopping the device from time to time for cleaning purposes.

The invention has for a further object to enhance the action stated in the foregoing paragraph incident to the disposal of the stripping roller axis and the lengthwise running dimensions of the companion stripper member along fore and aft lines in the direction of movement of the device and on an inclination from front to rear.

The endless stripper member is preferably in the form of a chain which effectively pulls the cotton stalks into the throat defined between the inner run of the chain and the confronting periphery of the stripper roller. The action of the chain or endless stripper member also carries the stalks past the dead bearing and bearing cage to avoid clogging of the same and any incidental stoppage of the gathering mechanism of the device.

A further object of the invention is to incorporate a conveyor, preferably in the form of an auger which will evacuate the gathered cotton promptly from the stripper roll and its companion chain and which may also have a cleaning effect on the stripper roll.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 3 is a bottom plan view of the attachment with parts broken away.

FIGURE 4 is a vertical cross-sectional view taken on the line 4—4 in FIGURE 2.

FIGURE 5 is a perspective view of the endless chain stripper member.

Figure 1:
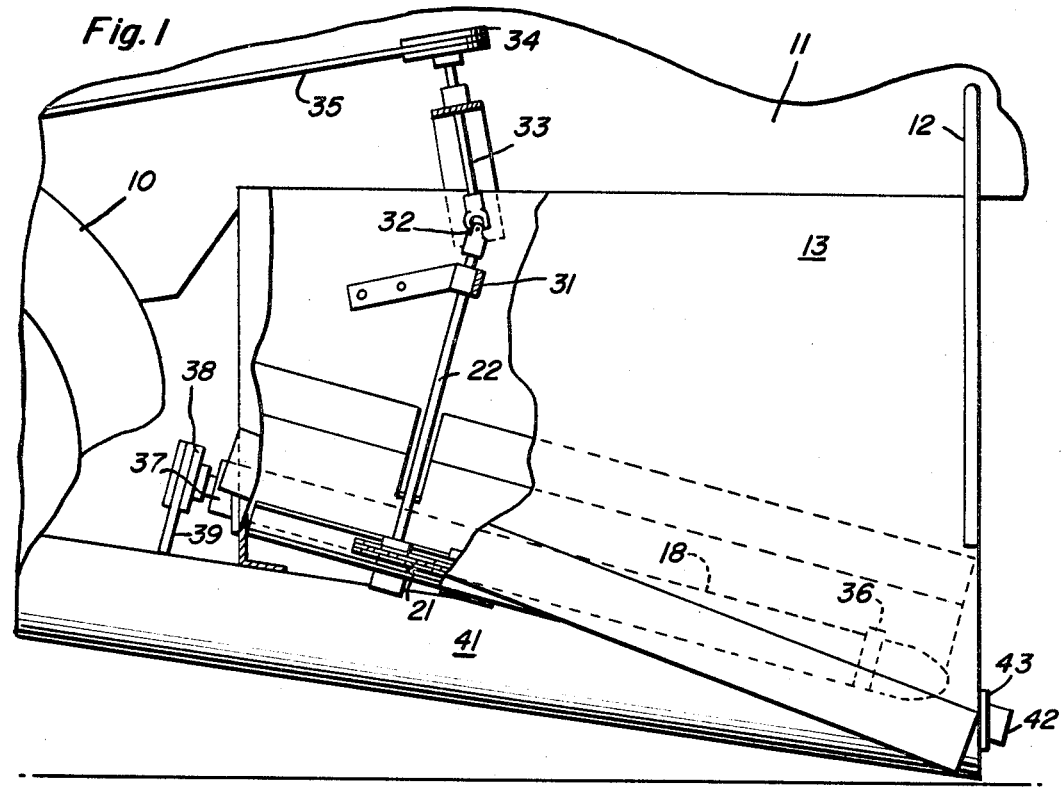
FIGURE 1 is a fragmentary side elevational view of a tractor or other self-propelled vehicle having a gathering or harvesting attachment affixed forwardly thereof according to the present invention.
Figure 2:
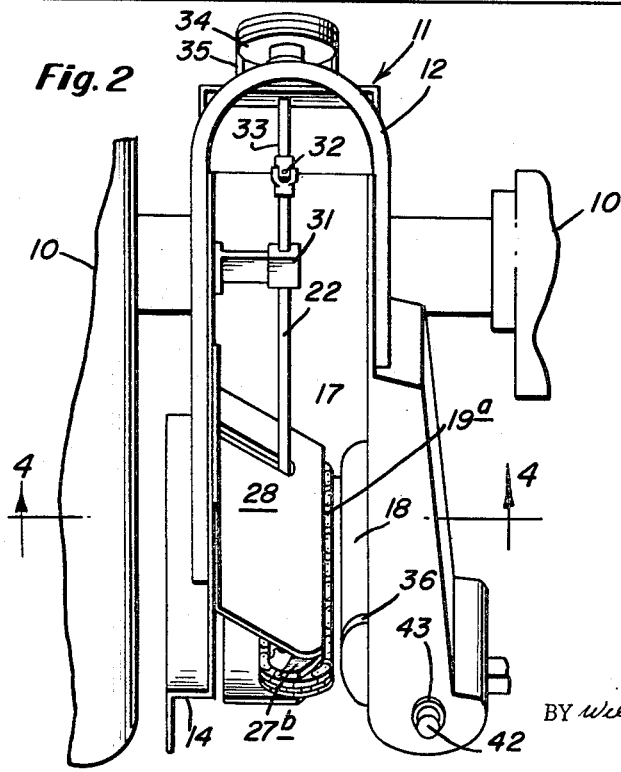
FIGURE 2 is a fragmentary front elevational view of the cotton harvesting device showing environmental parts of the tractor or self-propelled vehicle.

Referring more particularly to the drawings, 10 in FIGURES 1 and 2 designates a portion of a tractor or other self-propelled vehicle adapted to travel down the rows of cotton plants, and 11 is a forward extension thereof in which the cotton harvesting device of the invention is contained.

An arch member 12, shown in FIGURES 1 and 2, is a part of the extension and it serves to support the front part of the cotton harvesting attachment indicated generally at 13, the rear portion of this harvesting attachment 13 being attached to the adjacent parts of the harvester 10.

As shown in FIGURES 2 and 4 a lower structural member 14 of the extension 11 provides with the arch 12 for the support of an upright side panel or wall 15 which, together with a similar upright side panel 16 spaced from the panel 15, defined a passageway 17 through which the cotton plants are received incident to the movement of the vehicle down the rows. This passageway 17 runs fore and aft of the machine and in such passageway is disposed the stripper couple which in this case comprises a stripper roller 18 and an endless stripper member 19, preferably a chain.

As best seen in FIGURE 4, the inner run 19ª of this endless chain is spaced laterally from the stripper roller 18 to constitute a throat into which is received the stalks of the cotton plants, as indicated in FIGURE 4 and will be well understood in this art.

The endless stripper chain 19 runs around a lower sprocket 20 and an upper sprocket 21, one such sprocket, for instance, the upper sprocket 21, being driven by a shaft 22, shown also in FIGURE 1. The sprockets are journalled in a mounting plate 23, as shown in FIGURES 4 and 5, such mounting plate being carried by brackets 24 and 25 secured by bolts 26 to the structural member 14. A substantially Z-shaped bar 27, welded or otherwise affixed to the mounting plate 23, is vertically disposed between the two runs of the endless stripper chain 19 and provides a support for the inner portion of an inclined shield plate 28, affixed as by bolts 29 to the upright panel 15 or other suitable part.

In FIGURE 3 a chain tightening device 30 is included in association with the lower sprocket 20 to permit of taking up slack in the endless stripper chain member 19.

In FIGURE 2 the chain drive shaft 22 is journalled in a bracket 31 affixed to a suitable structural part of the attachment 13 and such shaft 22 above the bearing 31 is connected by universals 32 to a connecting shaft 33 driven in any suitable manner as from the tractor power take-off as by a pulley 34 and belt 35 drive.

The stripper roll 18 is journalled in suitable bearings 36 and 37 and this stripper roll may be driven by pulley 38 and belt 39 arrangement, as indicated in FIGURE 1, or by any other drive.

A rotary screw conveyor or auger 40 is provided in association with the stripper roll 18, preferably mounted laterally and subjacent to the roll 18 on the side thereof opposite the endless stripper chain 19, as best seen in FIGURE 4. The external peripheral edge of the auger convolutions are preferably in contact with the peripheral surface of the stripper roll 18 so as to perform a cleaning function on the stripper roll 18. The roll 18 and the auger 40 are preferably driven in the same direction, as indicated by the arrows in FIGURE 4 which indicates a clockwise movement of both rolls. This mutual arrangement causes the cylindrical surface of the stripper roll 18 adjacent the stripper chain 19 to move in a constantly ascending motion so as to strip the cotton upwardly from the stalks while the opposite or outer cylindrical surface of the roller 18 is on a descending motion which is opposed to the ascending motion of the inner side of the auger 40, which latter motion tends to constantly maintain the gathered cotton in the upper portion of the auger. The lower end of the panel or wall 16 is for this purpose brought down close to the peripheral surface of the auger 40.

A trough 41, which may be a lower extension of the wall 16, underlies the auger 40 and preferably extends across the nip between the stripper roll 18 and the auger 40. This trough will catch small portions of lint and the auger will tend to move any lint rearwardly of the attachment in the trough.

The front journal 42 of the auger, as shown in FIGURE 2, is mounted in a bearing 43 and the rear end of the auger is also mounted in a bearing 44 affixed to the attachment, and a pulley 45 and belt 46 connected to the vehicle drive may be employed to rotate the auger.

The top rail 27ª of the bar 27 extends forwardly of the front sprocket 20 and is curved outwardly to form a stalk guiding member for deflecting the plant stalks into the throat between the stripper roll 18 and the inner chain run 19ª.

In the use of the device the vehicle proceeds down the rows of cotton in such alinement as will cause the stalks of the cotton plants to be received in the stripper throat between the chain run 19ª and the stripper roll 18. The stripper roll will perform an upward stripping action accentuated by the rearward inclining disposition of the stripper roll. At the same time the inclined chain will have a stripping action and will press the stalks against the ascending surface of the stripper roll 18 so as to complement the stripping action of the roll 18 and itself to perform not only a stripping action but a rearward movement of the stalks in the throat which itself will also tend to perform a further and more complete stripping action.

At the same time the chain or some other rough endless member will tend to partially roll the stalk and to pull it down rearwardly in a bending action due to the fact that the endless stripper member is given a speed of movement in a rearward direction preferably greater than the ground speed of the vehicle. A preferred speed is substantially two-and-one-half times the speed of the vehicle so that the action of the inner run 19ª of the chain upon the stalks will be an appreciable movement to pull the stalks down in a rearwardly bending action.

The cotton will thus be stripped from the stalks by the conjoint action of the stripper chain and stripper roll 18, the gathered cotton being directed upwardly and being prevented by the shield 28 from getting into the chain and its drive mechanism. The inclination of this shield will tend to divert the gathered cotton toward the stripper roller 18 which is turning in a direction to cause the gathered cotton to be diverted over to the auger 40, which latter tends to evacuate the cotton rearwardly from the trough and the passageway. This gathered cotton is collected in the usual manner at the rear end of the attachment.

The drawings illustrate only one embodiment of which the invention is susceptible. This embodiment being particularly applicable to International Harvester Company and John Deere constructions. Although the drawings show only a single row stripper, it will be understood that the device may be repeated at the other side of the machine and used in a two-row stripper.

The chain will act to pull the cotton stalks into the throat so that a more effective cleaning job may be done. The chain also carries the stalks past the bearings and positively moves the cotton stalks into the machine. This is all done without any possibility of clogging of the throat or passageway or any of the parts therein. The elimination of clogging also eliminates any stopping of the machine to perform cleaning operations and thus increases the economic value of the device.

The stripper chain is also exposed to foreign material such as dead cotton stalks or any other dead stalks and acts to remove the same effectively without clogging or stopping of the machine.

The stripper chain operates upon the stalks throughout the full length of the stripper roll. The operation of the invention operates to take the cotton from the stalk in a much cleaner action.

Although I have disclosed herein the best form of the invention known to me at this time, I reserve the right to all such modifications and changes as may come within the scope of the following claims.

What is claimed is:

1. For use with a self-propelled vehicle, a cotton harvesting device comprising
   (a) a structural attachment forwardly of the vehicle having a longitudinal fore and aft passageway for the cotton plants therethrough as the vehicle is driven forwardly,
   (b) a rotary stripper roll mounted in said attachment in the passageway thereof with an axis of rotation inclined from front to rear and in substantially the direction of movement of the harvester,
   (c) an endless stripper member also mounted in said attachment in the passageway and disposed on an inclination from front to rear and having an inner rearwardly moving run confronting and spaced laterally from the stripper roll to form a stalk-receiving throat therebetween,
   (d) means for rotating said stripper roll in a direction in which its peripheral portion moves upwardly through the throat for stripping the cotton bolls upwardly, and
   (e) means for continuously driving the endless stripper member so that the stalks of the plants entered in the throat are given an upward stripping action at the roll side and a rearward and rolling motion at the endless stripper member side for cleanly removing the cotton bolls and simultaneously effecting clearing action preventing clogging or the necessity for stopping the device for cleaning.

2. A cotton harvesting device as claimed in claim 1, in which
   (f) said endless stripper member is a chain.

3. A cotton harvesting device as claimed in claim 1 further comprising
   (f) means adjacent the stripper roll for moving the gathered cotton rearwardly of the passageway.

4. A cotton harvesting device as claimed in claim 1, further comprising
   (f) a rotary auger disposed in contact with said stripper roll at the side opposite the stripper member for evacuating the gathered cotton from the passageway and effecting cleaning of the stripper roll.

5. A cotton harvesting device as claimed in claim 4, further comprising
   (g) a trough below the auger and extending across the nip between the auger and the stripper roll.

6. A cotton harvesting device as claimed in claim 1, in which
   (f) said last-named means drives the endless stripper member at a speed in excess of the ground speed of the vehicle.

7. A cotton harvesting device as claimed in claim 6, in which
   (g) the speed of movement of the endless stripper member is of the order of two-and-a-half times the ground speed of the vehicle.

References Cited

UNITED STATES PATENTS

| | | | |
|---|---|---|---|
| 2,532,065 | 11/1950 | Hyman | 56—33 |
| 2,560,974 | 7/1951 | May | 56—14 |

RUSSELL R. KINSEY, *Primary Examiner.*